United States Patent
N et al.

(10) Patent No.: US 11,477,113 B2
(45) Date of Patent: Oct. 18, 2022

(54) WEIGHTED MULTICAST JOIN LOAD BALANCE

(71) Applicant: Juniper Networks, Inc., Sunnyvale, CA (US)

(72) Inventors: Vinod Kumar N, Bangalore (IN); Robert W. Kebler, Newburyport, MA (US); Ashok Patrick Jude Manoharan, Pleasanton, CA (US); Hariharan Boopathy, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/996,449

(22) Filed: Aug. 18, 2020

(65) Prior Publication Data
US 2022/0060407 A1 Feb. 24, 2022

(51) Int. Cl.
*H04L 12/28* (2006.01)
*H04L 45/16* (2022.01)
*H04L 12/18* (2006.01)
*H04L 12/46* (2006.01)
*H04L 45/28* (2022.01)
*H04L 45/50* (2022.01)

(52) U.S. Cl.
CPC ............ *H04L 45/16* (2013.01); *H04L 12/185* (2013.01); *H04L 12/4641* (2013.01); *H04L 45/28* (2013.01); *H04L 45/50* (2013.01)

(58) Field of Classification Search
None
See application file for complete search history.

(56) References Cited

U.S. PATENT DOCUMENTS

| 8,169,924 B2 * | 5/2012 | Sajassi | H04L 45/00 370/408 |
| 8,953,446 B1 | 2/2015 | Wang et al. | |
| 2011/0286450 A1 * | 11/2011 | Wijnands | H04L 45/02 370/390 |

(Continued)

FOREIGN PATENT DOCUMENTS

EP 3435595 A1 1/2019

OTHER PUBLICATIONS

Rosen et al. "Multicast in MPLS/BGP IP VPNs" Internet Engineering Task Force (IETF), Network Working Group, Internet Draft, Jul. 9, 2008, 92 pp.

(Continued)

*Primary Examiner* — Gerald A Smarth
(74) *Attorney, Agent, or Firm* — Shumaker & Sieffert, P.A.

(57) ABSTRACT

In some examples, a method includes receiving, by an egress network device for a network, messages from each of a plurality of ingress network devices for the network, wherein each of the messages specifies a multicast source, a multicast group, and an upstream multicast hop weight value for multicast traffic for the multicast source and the multicast group; selecting, by the egress network device and based on the upstream multicast hop weight values specified by the received messages, one of the plurality of ingress network devices to which to send a multicast join message of a plurality of multicast join messages for the multicast source and multicast group; and sending, by the egress network device, the multicast join message to the selected one of the plurality of ingress network devices.

16 Claims, 7 Drawing Sheets

(56) References Cited

U.S. PATENT DOCUMENTS

| | | | |
|---|---|---|---|
| 2014/0089454 A1* | 3/2014 | Jeon | H04L 67/2842 709/213 |
| 2016/0043875 A1* | 2/2016 | Kotalwar | H04L 12/185 370/390 |
| 2016/0043876 A1 | 2/2016 | Kotalwar et al. | |
| 2017/0034047 A1* | 2/2017 | Bhattacharya | H04L 45/28 |

OTHER PUBLICATIONS

Extended European Search Report from counterpart EP Application No. 20206193.3, dated Apr. 19, 2021, 9 pp.

Adams et al. "Protocol Independent Multicast-Dense Mode (PIM-DM): Protocol Specification (Revised)" Network Working Group, RFC 3973, Jan. 2005, 61 pp.

Fenner et al., "Protocol Independent Multicast-Sparse Mode (PIM-SM): Protocol Specification (Revised)," RFC 4601, Network Working Group, Aug. 2006, 112 pp.

Holbrook et al., "Source-Specific Multicast for IP," Network Working Group, RFC 4607, The Internet Society, Aug. 2006, 19 pp.

Handley et al., "Bidirectional Protocol Independent Multicast (BIDIR-PIM)," Network Working Group, RFC 5015, Oct. 2007, 43 pp.

Rosen et al. "Multicast in MPLS/BGP IP VPNs" Internet Engineering Task Force (IETF), RFC 6513, Feb. 2012, 88 pp.

Aggarwal et al., "BGP Encodings and Procedures for Multicast in MPLS/BGP IP VPNs," RFC 6514, Internet Engineering Task Force (IETF), Feb. 2012, 59 pp.

Response to Extended Search Report dated Feb. 28, 2022, from counterpart European Application No. 20206193.3, filed Aug. 23, 2022, 27 pp.

* cited by examiner

WEIGHTED MULTICAST JOIN LOAD BALANCE

TECHNICAL FIELD

The disclosure relates to computer networks and, more particularly, to distribution of multicast traffic over computer networks.

BACKGROUND

A computer network is a collection of interconnected computing devices that exchange data and share resources. In a packet-based network the computing devices communicate data by dividing the data into small blocks called packets. Certain devices within the network, such as routers and switches, maintain routing and/or forwarding information that describe paths through the network. In this way, the packets may be individually transmitted across the network from a source device to a destination device. The destination device extracts the data from the packets and assembles the data into its original form. Dividing the data into packets enables the source device to resend only those individual packets that may be lost during transmission.

Examples of computer networks include enterprise networks, branch networks, service provider networks, home networks, virtual private networks (VPNs), local area network (LANs), virtual LANs (VLANs) and the like. In any case, the computer networks may enable remotely located sources and receivers to share data. In some cases, the computer network may be configured to support multicast traffic, such as Internet Protocol Television (IPTV), desktop conferences, corporate broadcasts, music and video web casts, and other forms of multimedia content. For example, the computer network may utilize protocol independent multicast (PIM) as a multicast routing protocol to build distribution trees through the computer network for the transmission of multicast traffic between sources and receivers within customer sites for particular multicast groups. PIM may operate in several different modes, including Dense Mode (DM), Sparse Mode (SM) in Source-Specific Multicast (SSM) mode or Any Source Multicast (ASM) mode, and Bidirectional (BIDIR) mode.

In addition, the computer network may be configured to support multicast VPNs (MVPNs) to enable Internet Protocol (IP) multicast traffic to travel between sources and receivers within customer sites. For one or more Border Gateway Protocol (BGP) MVPNs, provider edge (PE) routers coupled to the customer sites may conceptually build a multicast tree to carry multicast traffic from a multicast source through the public network so that the customer sites receive the multicast traffic as if the customer sites were directly attached to the same private network as the source.

SUMMARY

In general, this disclosure describes techniques for flexibly distributing multicast join messages to enable tailored delivery of multicast traffic. The techniques allow ingress network devices of a network to send upstream weight advertisements to an egress network device, which the egress network device then uses to flexibly distribute multicast join messages for a multicast source and group among upstream ingress network devices. The egress network device may receive messages from each of the ingress network devices that specify an upstream multicast hop (UMH) weight value for the corresponding ingress network device. The egress network device selects, based on the upstream multicast hop weight values specified by the received messages, one of the ingress network devices to which to send a multicast join message of a plurality of multicast join messages for the multicast source and multicast group.

As one example, this disclosure defines a new Transitive BGP Extended Community Attribute called "UMH-Weight" to indicate Upstream Multicast Hop Weight of a BGP-MVPN PE router. The UMH-Weight community attribute may be included in MVPN auto discovery (Type-1) messages sent by the ingress network devices. As one example, this disclosure sets forth extensions to a BGP MVPN Join Load Balance algorithm to flexibly distribute MVPN Join messages. In other examples, such as in a native PIM deployment instead of BGP MVPN, the UMH-Weight value may be a field in a PIM message. In some examples, the egress network device uses the received upstream multicast hop weight values of the ingress network devices to determine a proportion of multicast join messages to send to each ingress network device.

In one example aspect, a method includes receiving, by an egress network device for a network, messages from each of a plurality of ingress network devices for the network, wherein each of the messages specifies a multicast source, a multicast group, and an upstream multicast hop weight value for multicast traffic for the multicast source and the multicast group; selecting, by the egress network device and based on the upstream multicast hop weight values specified by the received messages, one of the plurality of ingress network devices to which to send a multicast join message of a plurality of multicast join messages for the multicast source and multicast group; and sending, by the egress network device, the multicast join message to the selected one of the plurality of ingress network devices.

In another example, a network device includes a memory; and one or more processors implemented in circuitry and configured to: receive messages from each of a plurality of ingress network devices for a network, wherein each of the messages specifies a multicast source, a multicast group, and an upstream multicast hop weight value for multicast traffic for the multicast source and the multicast group; select, based on the upstream multicast hop weight values specified by the received messages, one of the plurality of ingress network devices to which to send a multicast join message of a plurality of multicast join messages for the multicast source and multicast group; and send the multicast join message to the selected one of the plurality of ingress network devices.

In a further example, a method includes determining, by an ingress network device for a network and based on an amount of upstream access bandwidth between the ingress network device and a customer edge device, an upstream multicast hop weight value for multicast traffic for a multicast source and a multicast group, the customer edge device being positioned between the ingress network device and the multicast source; and sending, by the ingress network device and to one or more peer network devices for the network, a message specifying the upstream multicast hop weight value for the multicast traffic, wherein the message further specifies the multicast source and the multicast group.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
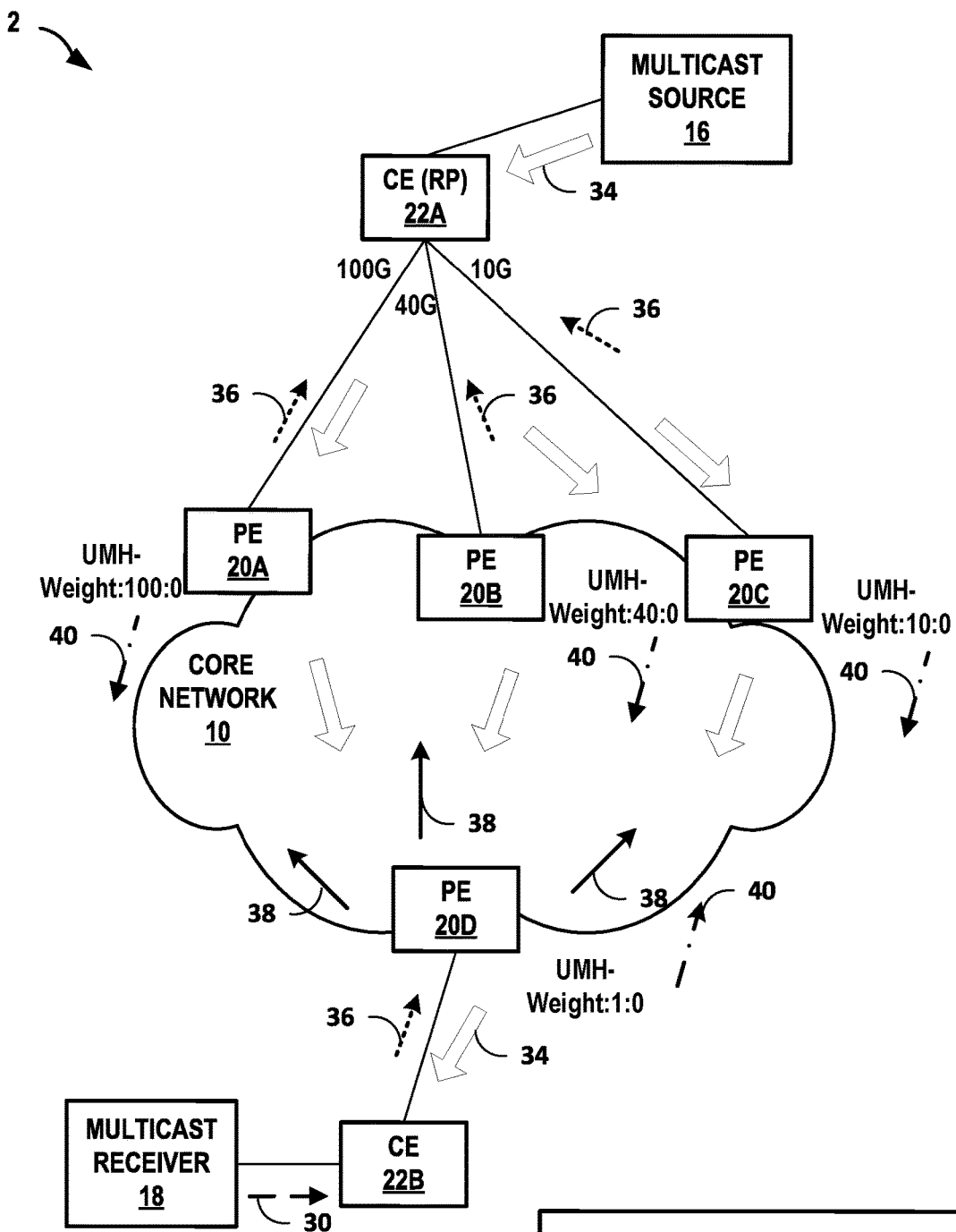
FIGS. 1-4 are block diagrams illustrating example computer networks including network devices configured to transmit multicast traffic between a multicast source and a multicast receiver, in accordance with various aspects of the techniques of this disclosure.

FIG. 1 is a block diagram illustrating an example computer network 2 including network devices configured to transmit multicast traffic between a multicast source 16 and a multicast receiver 18, in accordance with aspects of the techniques of this disclosure. FIG. 1 illustrates a network 2 having network devices configured to use upstream weight advertisements for flexibly distributing multicast join messages, in accordance with the techniques of this disclosure.

Network 2 may comprise a private network or a public network, such as the Internet. For example, network 2 may be an enterprise network, a campus network, a service provider network, a home network, a local area network (LAN), a virtual local area network (VLAN), virtual private network (VPN), or another autonomous system. In any of these examples, remotely located multicast source 16 and multicast receiver 18 may share data via network 10. In an example of network 2 as an enterprise network, each of multicast source 16 and multicast receiver 18 may comprise one or more servers or employee computer terminals located in different regions of a single office location or may comprise a remote office location of a corporation.

In the example illustrated in FIG. 1, multicast source 16 provides multicast traffic for one or more multicast groups, and multicast receiver 18 may request or subscribe to traffic from one or more multicast groups. Multicast source 16 may also referred to herein as a "customer source (C-source)." Multicast receiver 18 may be an Internet Group Management Protocol (IGMP) host interested in receiving multicast traffic of a certain multicast group. In general, IGMP is a communications protocol used by hosts and adjacent routers to establish multicast group members. In the example of FIG. 1, IGMP operates between multicast receiver 18 and customer edge (CE) router 22B. CE router 22B may be configured to use IGMP to communicate with multicast receiver 18. For example, multicast receiver 18 sends an IGMP join request 30 for joining a multicast group to receive multicast traffic from multicast source 16.

Network 2 includes a plurality of network devices, including provider edge (PE) router 20A, PE router 20B, and PE router 20C that are all connected to multicast source 16 via CE router 22A. Multicast source 16 is therefore referred to as being "multi-homed" to core network 10 because multicast traffic from multicast source 16 can reach core network 10 by multiple ingress PE routers (PE routers 20A, 20B, and 20C). PE routers 20A-20D ("PE routers 20") operate on the edge of core network 10.

In some cases, CE router 22B may be referred to as a last hop router (LHR) connected to receiver 18. In some examples, receiver 18 is connected to core network 10 by a layer two (L2) broadcast communication domain such as a local area network (LAN) (e.g., an Ethernet LAN), and CE router 22B may be physically coupled to the L2 communication domain by a respective LAN interface. In some cases, CE router 22A may be referred to as a first hop router (FHR) connected to multicast source 16. A typical network topology includes multiple network devices within core network 10, but for purposes of illustration, these additional network devices are not shown in FIG. 1.

Each of source 16 and receiver 18 may be included in a remote customer site (not shown) that may be a local area network (LAN) or a wide area network (WAN) comprising a plurality of subscriber devices, such as desktop computers, laptops, workstations, PDAs, wireless devices, network-ready appliances, file servers, print servers or other devices. The remote sites may be configured to support multicast traffic, such as Internet Protocol Television (IPTV), desktop conferences, corporate broadcasts, music and video web casts, and other forms of multimedia content.

In the illustrated example, network 2 includes a core network 10, including network devices that use multicast routing protocols, such as Protocol Independent Multicast (PIM) and Border Gateway Protocol (BGP), to route multicast traffic through network 10 between multicast source 16 and multicast receiver 18 for particular multicast groups. Network 10 may be a Multi-Protocol Label Switching (MPLS) network, for example. In some examples, network 10 may include one or more multicast virtual private networks (MVPNs) to enable multicast traffic to travel between sources and receivers, e.g., source 16 and receiver 18, within remote customer sites. The MVPNs may be established between PE routers 20 of network 10. As shown, after being signaled by PE router 20D that there is an interested receiver for multicast source 16, PE routers 20A-20C may send PIM join requests 36 to CE 22A indicating they have interested receiver(s) for multicast source 16. The PIM protocol may operate in several different modes, including Dense Mode (DM), Sparse Mode (SM) in Source-Specific Multicast (SSM) mode or Any Source Multicast (ASM) mode, and Bidirectional (BIDIR) mode. Additional information regarding PIM protocols may be found in Adams, A., et al., "Protocol Independent Multicast Version 2-Dense Mode Specification," RFC 3973, 2005; Fenner, B., et al., "Protocol Independent Multicast-Sparse Mode (PIM-SM): Protocol Specification (Revised)," RFC 4601, 2006; Holbrook, H. and B. Cain, "Source-Specific Multicast for IP," IETF RFC 4607, 2006; and Handley, M., et al., "Bidirectional Protocol Independent Multicast (BIDIRPIM)," IETF RFC 5015, 2007, the entire contents of each of which are incorporated by reference herein.

Core network 10 is a network including unicast upstream multicast hop (UMH) and Selective Provider Tunnels (also referred to herein as "selective tunnels"). Inclusive Provider Tunnels (also referred to herein as "inclusive tunnels") may be configured on the PE routers 20 such that any multicast packet that is sent towards the core will be received by all the PE routers 20 connected to core network 10 for that MVPN irrespective of whether the PE routers 20 have interested listeners (receivers). That is, when using inclusive provider tunnels an ingress PE device injects multicast traffic in the MVPN by forwarding the traffic on all tunnels regardless of whether a receiver has expressly issued a join for the multicast source and group. In contrast, Selective Provider Tunnel mode may be configured on PE routers 20 such that traffic sent by a particular PE router is delivered to subset of PE routers in a given MVPN instance that have signaled interested receivers, rather than to all PE routers in the MVPN instance.

In general, core network 10 may include MVPN inclusive provider tunnels as single multicast distribution trees configured to carry all multicast traffic from a set of one or more MVPNs. Core network 10 may alternatively or additionally include MVPN selective provider tunnels as single multicast distribution trees configured to carry multicast traffic for a set of one or more multicast groups from one or more MVPNs. In one example, the MVPN inclusive tunnels or selective tunnels may be established through core network 10 using the PIM protocol.

PE routers participating in BGP MVPNs that use the BGP control plane use seven types of BGP MVPN routes (messages), five of which are used for auto-discovery and two for C-multicast protocol information exchange between provider edge (PE) routers.

For example, PE routers 20 advertise their MVPN membership to other PE routers 20 using BGP, and PE routers 20 exchange BGP routing protocol messages to advertise various types of routes for controlling multicast distribution within network 2.

For example, in a BGP MVPN, an MVPN type 1 route is an intra-autonomous system (AS) inclusive provider multicast service interface (I-PMSI) auto discovery (AD) route that is originated by all PE routers participating in an MVPN. The MVPN type 1 route includes a route type indicator, an originating router route distinguisher (RD), and an originating router loopback address.

An MVPN type 2 route is an inter-AS I-PMSI AD Route that is originated by all ASBR PE routers. The MVPN type 2 route includes a route type indicator, an originating router RD, and an AS number of the originating ASBR.

An MVPN type 3 route is a selective provider multicast service interface (S-PMSI) AD Route that is originated by the sender PE router (the sender PE that initiates the S-PMSI). The MVPN type 3 route includes a route type indicator, an originating router RD, Customer multicast Source address (C-S) Mask (32 for IPv4; 128 for IPv6), C-S Using S-PMSI, Customer multicast Group address (C-G) Mask (32 for IPv4; 128 for IPv6), C-G Using S-PMSI, and originating Router Loopback Address.

An MVPN type 4 route is a leaf AD Route that is originated by receiver PE routers in response to receiving S-PMSI AD routes with the "leaf information required" flag set from the sender PE router. The MVPN type 4 route includes a route type indicator, an S-PMSI AD route, and an originating router loopback address.

An MVPN type 5 route is a source active AD Route that is originated by the PE router that discovers an active VPN multicast source. The MVPN type 5 route includes a route type indicator, an originating router RD, C-S Mask (32 for IPv4; 128 for IPv6), Customer multicast Source address, C-G Mask (32 for IPv4; 128 for IPv6), Customer multicast Group address.

An MVPN type 6 route is a shared tree join route that is originated by the receiver PE router (the PE that receives a (C-*, C-G) join message from a VPN interface). The MVPN type 6 route includes a route type indicator, RD of Upstream PE (towards Customer Rendezvous Point (C-RP)), AS Number of Upstream PE (towards C-RP), C-RP Mask (32 for IPv4; 128 for IPv6), Customer Rendezvous Point Address, C-G Mask (32 for IPv4; 128 for IPv6), and Customer multicast Group address.

An MVPN type 7 route is a source tree join route that is originated by the receiver PE router (the PE that receives a local (C-S, C-G) join message or the PE that already has a Type 6 route and receives a Type 5 route). The MVPN type 7 route includes a route type indicator, RD of Upstream PE (towards C-S), AS Number of Upstream PE (towards C-S), C-S Mask (32 for IPv4; 128 for IPv6), Customer multicast Source Address, C-G Mask (32 for IPv4; 128 for IPv6), and Customer multicast Group address.

Additional information regarding MVPN may be found in Rosen, E., et al., "Multicast in MPLS/BGP IP VPNs," RFC 6513, February 2012, and Rosen, E., et al., "BGP Encodings and Procedures for Multicast in MPLS/BGP IP VPNs," RFC 6514, February 2012, the entire contents of each of which are incorporated by reference herein.

In the topology shown in FIG. 1, PE router 20D is an egress PE router to core network 10, in that PE router 20D receives multicast traffic from core network 10 and forwards the multicast traffic towards receivers external to core network 10. PE router 20A, PE router 20B, and PE router 20C are ingress PE routers to the core network 10, in that they receive multicast traffic from outside core network 10 (initiated by a multicast source 16) and forward it into core network 10 toward receiver 18. Multicast source 16 (a Customer-Multicast Source) is multi-homed to core network 10 via a first ingress network device (ingress PE router 20A), a second ingress network device (ingress PE router 20B), and a third ingress network device (ingress PE router 20C), in the example of FIG. 1. Assume that BGP MVPN is configured to execute on PE router 20A, PE router 20B, PE router 20C, and PE router 20D, in BGP MVPN shared-tree data distribution mode (sometimes referred to as "rendezvous point tree shortest path tree (RPT-SPT) mode"). PE router 20D is configured with unicast upstream multicast hop (UMH) such that PE router 20D selects the upstream PE routers solely based on their unicast algorithms. Although referred to herein as ingress PE routers, PE routers 20A-20C may be configured to operate as egress routers in other network contexts. Similarly, although referred to in FIG. 1 as an egress PE router, PE router 20D may be configured to operate as an ingress router in other network contexts.

When a PE router receives a C-Join or C-Prune message from a CE router, the message identifies a particular multicast flow as belonging either to a source-specific tree (S,G) or to a shared tree (*,G). The term "C-root," i.e., customer-root, is used herein to refer to the multicast source S, in the case of a source-specific tree, or to the Rendezvous Point (RP) for G, in the case of (*,G). If the route to the C-root is across the VPN backbone network, then the PE router needs to find the "Upstream Multicast Hop" (UMH) for the (S,G) or (*,G) flow. The UMH is either the PE router at which (S,G) or (*,G) data packets enter the VPN backbone or the Autonomous System Border Router (ASBR) at which those data packets enter the local AS when traveling through the VPN backbone. The process of finding the upstream multicast hop for a given C-root is known as "upstream multicast hop selection."

Egress PE router 20D can be provisioned to hash (load balance) MVPN join messages across the multi-homed upstream PE routers 20A-20C. Egress PE router 20D performs a bytewise-XOR-hash as defined in RFC 6513. In the absence of the techniques of this disclosure, PE router 20D would hash MVPN joins equally among PE routers 20A-20C. For example, if PE router 20D receives joins for three flows from CE router 22B, then PE router 20D sends join messages corresponding to Flow 1 to PE router 20A, sends join messages corresponding to Flow 2 to PE router 20B and sends join messages corresponding to Flow 3 to PE router 20B. MVPN Joins get distributed equally among the multi-homed upstream PE routers 20A-20C. MVPN Join hash is applicable for both Shared Tree Joins (*,G) and Source Tree Joins (S,G). Sending an equal amount of join messages across all multi-homed upstream PE routers may be problematic in some situations. For example, in some cases, equally distributing join messages may result in inefficient usage of network resources, such as by overloading certain links while underutilizing others.

The techniques of this disclosure enable flexibility in distribution of MVPN Joins in Multi-Homed scenarios to cater to a variety of use cases including: hashing based on upstream preference/weight; excluding certain upstream PE routers from hash; using a least loaded hash approach; hashing based on bandwidth of each multicast group/channel; hashing based on upstream access bandwidth; and selecting a backup upstream PE router based on hash.

This disclosure describes extensions to a BGP MVPN join load balance algorithm to achieve flexibility in distribution of MVPN Joins. This solution defines a new transitive BGP extended community attribute called "UMH-Weight" to indicate Upstream Multicast Hop Weight of a BGP-MVPN PE router. Every BGP-MVPN PE router constructs a "UMH-Weight" Extended Community Attribute as follows. The Global Administrator field will be set to an integer value representing weight. In some examples, the value of the MVPN weight can be provisioned. The provisioned value could be zero or any non-zero value. If not provisioned, MVPN weight may be automatically derived by the PE router, such as based on upstream access bandwidth of the access link (or link aggregation group) between the PE router and the CE router towards the multicast source. The Local Administrator field will be set to a value of zero. Thus, the UMH-Weight extended community attribute is of the form:

UMH-Weight:X:0 where 'X' is provisioned weight or auto-derived weight.

PE routers 20 are configured to attach the "UMH-Weight" Extended Community Attribute to an auto discovery message (e.g., a type 1 MVPN route 40) originated by each of the PE routers 20. A new MVPN configuration option triggers the PE routers 20 to attach the "UMH-Weight" Extended Community to the type 1 MVPN route 40.

By virtue of receiving the auto discovery routes from ingress PE routers 20A-20C, MVPN on egress PE router 20D has access to the additional data point(s) of the UMH-Weight values. UMH-Weight of all PE routers 20A-20C is provided as an input to a hashing algorithm on egress PE router 20D.

If UMH-Weight Extended Community is not present in a Type 1 MVPN route 40 received from an upstream PE router (e.g., a Legacy BGP-MVPN PE router), then the MVPN process provides a default UMH-Weight value of one to the hashing algorithm on egress PE router 20D. If UMH-Weight in a received auto discovery message has a value of zero, then egress PE router 20D excludes the upstream PE router from hash computation and no join messages are sent to the upstream PE router that advertised the weight of zero. Egress PE router 20D hashes the MVPN shared tree join routes or source tree join routes (Type 6/Type 7 routes) across PE routers 20A-20C according to the UMH Weights.

In some examples, the MVPN Join Hashing Algorithm on egress PE router 20D can further be enhanced by feeding data on bandwidth of each Multicast Stream/Flow via policy on egress PE router 20D. The policy may indicate which multicast groups have high or varying amounts of bandwidth. For example, a flow may be counted as more than one flow if it corresponds to a multicast group that has high or varying amounts of bandwidth. In some example, the policy accounts for bandwidth behind the upstream access bandwidth, such as the bandwidth between the CE router and the C-RP.

In the example of FIG. 1, the upstream access bandwidth between PE router 20A and CE router 22A is 100 Gigabytes, the upstream access bandwidth between PE router 20B and CE router 22A is 40 Gigabytes, and the upstream access bandwidth between PE router 20C and CE router 22A is 10 Gigabytes. In respective type-1 MVPN routes 40, ingress PE router 20A advertises in a UMH-Weight:100:0; UMH-Weight:40:0 from ingress PE router 20B and UMH-Weight: 10:0 from ingress PE router 20C. In some examples, each of the ingress PE routers automatically derives the UMH weight values based on the upstream access bandwidth amounts. In other examples, each of the ingress PE routers is configured with the UMH weight value to use. Egress PE router 20D would also advertise UMH-Weight Extended Community attribute, UMH-Weight:1:0, but this is not significant as egress PE router 20D is only playing role of an egress MVPN PE router with respect to the network topology in FIG. 1.

Egress PE router 20D is configured to perform Weighted MVPN Join Load Balance in accordance with the techniques of this disclosure. Assume that egress PE router 20D receives join request messages 36 ("joins") (e.g., PIM join request messages 36) for 100 flows from CE router 22B. As one example, egress PE router 20D calculates the sum of UMH Weights of all Multi-Homed PEs, Y, and also calculates a percentage P of MVPN Joins (e.g., BGP Type-7 route 38) to be hashed to an upstream PE router according to the following equation:

$$P=(X*100)/Y,$$

where X is the UMH Weight of the Multi-Homed upstream PE router. In this example, the sum of UMH Weights of all Multi-Homed PEs is Y=150=(100+40+10).

As a result of Weighted MVPN Join hash computation, egress PE router 20D would send 67 MVPN Joins to Upstream PE1, 27 MVPN Joins to Upstream PE2, and 6 MVPN Joins to Upstream PE3. In some examples, egress PE router 20D follows the computation details below:

Step-1: Load distribution based on upstream weight [(X*100)/Y]
   67 Joins to PE1
   27 Joins to PE2
   6 Joins to PE3

Step-2: Based on load computation across Multi-Homed Upstream PEs (Step-1), each Upstream PE is assigned with a list of numbers (index numbers) as below,
   67 Joins to PE1 [List of Numbers (index numbers):-0-66]
   27 Joins to PE2 [List of Numbers (index numbers):-67-93]
   6 Joins to PE3 [List of Numbers (index numbers):-94-99]

Step-3: Egress PE router 20D performs a bytewise exclusive-or (XOR) operation of all the bytes in the C-Root address for the multicast source and customer group (C-Group) address for the multicast group. The bytewise XOR operation is an exclusive disjunction logical operation that outputs "true" only when an odd number of inputs are true, and outputs false whenever an even number of inputs are true. The result of the bytewise XOR operation is taken modulo 100, irrespective of the number of PE routers in the candidate set. Call the result of the modulo 100 operation result N.

The Selected Upstream PE is then the one that corresponds to index number 'N' allocated in Step 2. Egress PE router 20D sends MVPN Join messages 38 to PE routers 20A-20C as computed above. The ingress PE routers 20A-20C will send PIM join requests 36 to CE router 22A. When the multicast source 16 sends multicast traffic 34, the multicast traffic flows through the network according to the join messages.

Balancing will not match bandwidth unless all (S, G) streams have the same bandwidth. Joins are Hashed on (S, G) and not bandwidth. Information on bandwidth of each Multicast Group/Channel is also considered for hash computation if provisioned on egress PE router 20D. The result is Weighted MVPN Join Load Balance.

If UMH-Weight is Zero, then egress PE router 20D excludes the Upstream PE is from hash computation, i.e., egress PE router 20D does not consider the Upstream PE for sending any Joins. For IPTV deployments, there are usually High Definition Channels and Standard Definition Channels. A policy can be provisioned on egress PE router 20D to indicate which groups are high bandwidth. This data indicating bandwidth of each multicast group/channel can also be fed to Weighted MVPN Join Hash Algorithm on egress PE router 20D, thereby further enhancing the algorithm.

Type 1 MVPN route may be refreshed with a New UMH-Weight Extended Community Value in the following cases: i) Change in Upstream Multicast Bandwidth due to addition/deletion of upstream PE-CE links; ii) Change in Provisioned UMH-Weight; iii) Upgrade of Legacy BGP-MVPN PE.

In the event of refreshing the Type 1 MVPN route with a New UMH-Weight Extended Community Value, MVPN Joins already hashed on egress PE router 20D would remain intact (not disturbed). The new UMH-Weight values would be considered for hashing subsequent Joins (New Joins). The user/administrator would also be provided an option to 'rebalance' MVPN Joins at an appropriate time. Because 'rebalancing' could be disruptive the administrator should choose appropriate time for this activity.

For Draft-Morin/Hot-Root-Standby deployments, the above procedure can be used to pick a Backup Upstream PE router as well. In this example, the egress PE router 20D excludes the Primary UMH and reruns the hash to pick Backup UMH.

Figure 2:
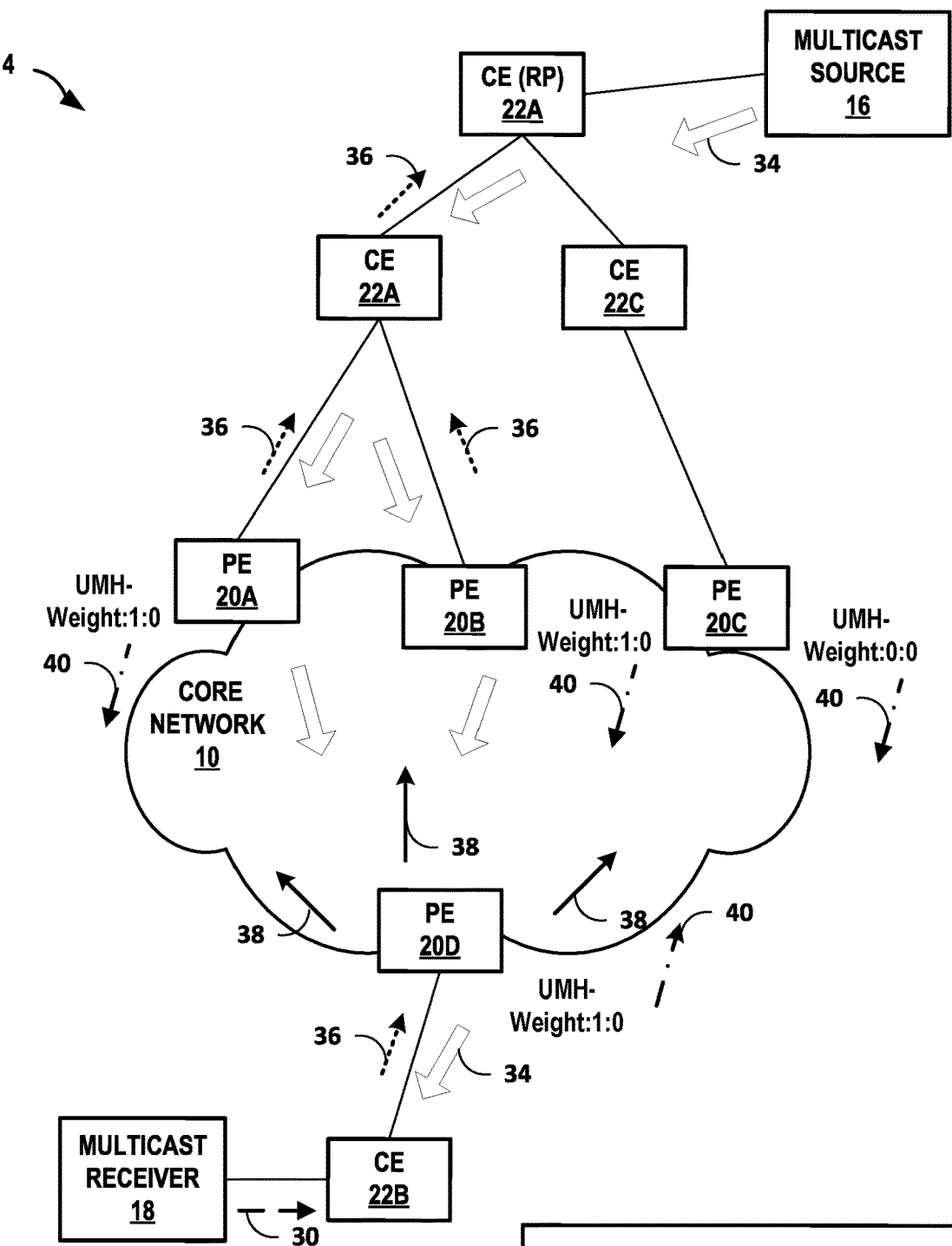

FIG. 2 is a block diagram illustrating an example computer network 4 including network devices configured to transmit multicast traffic between a multicast source 16 and a multicast receiver 18, in accordance with aspects of the techniques of this disclosure. Referring to FIG. 2, assume egress PE router 20D receives PIM join requests 36 from CE 22B for 90 flows. As per procedures defined in RFC 6513, in the absence of the techniques of this disclosure, egress PE router 20D would simply hash 30 MVPN Joins to each of Multi-Homed Upstream PE routers 20A-20C. However, there may be cases where it would be better not to consider certain PE routers for receiving multicast traffic. For example, a CE router such as CE router 22C may be undergoing maintenance.

As illustrated in FIG. 2, all BGP-MVPN PEs exchange a Type 1 MVPN Route 40 having a UMH-Weight Extended Community attribute. PE router 20A advertises a UMH-Weight value of one; PE router 20B advertises a UMH-Weight value of one; and PE router 20C advertises a UMH-Weight value of zero. The UMH-Weight data from the ingress PE routers is incorporated in the MVPN Join hash algorithm on egress PE router 20D. The number of MVPN Joins to be sent to each Multi-Homed Upstream PE router are computed by egress PE router 20D as per the formula set forth above. Because PE router 20C advertises UMH-Weight as zero, the techniques of this disclosure ensure that Joins are not hashed to PE router 20C. MVPN Joins are hashed only to PE router 20A and PE router 20B according to UMH-Weight. The result is Flexible MVPN Join Load Balance. As a result, only the multi-homed PE routers 20A, 20B forward on an PIM join request 36 and in turn, multicast traffic 34 from multicast source 16 flows only through CE router 22A and ingress PE routers 20A and 20B, and not through CE router 22C.

Figure 3:
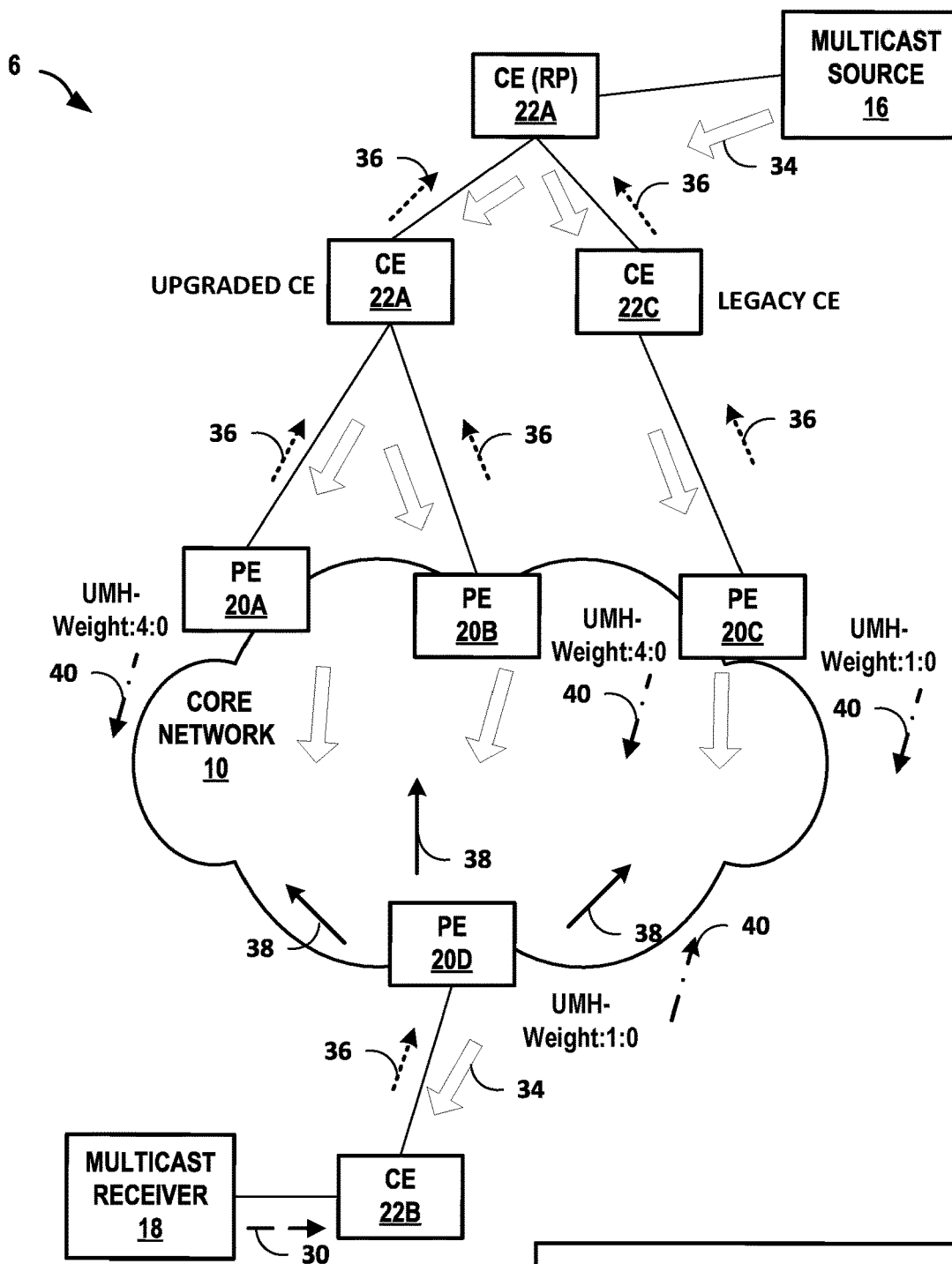

FIG. 3 is a block diagram illustrating an example computer network 6 including network devices configured to transmit multicast traffic between a multicast source 16 and a multicast receiver 18, in accordance with aspects of the techniques of this disclosure. As illustrated in FIG. 3, all BGP-MVPN PE routers 20 exchange Type 1 MVPN Routes 40 with UMH-Weight Extended Community attribute. PE router 20C advertises a UMH-Weight value of one (1) because PE router 20C is connected to a Legacy CE router 22C and it is desirable for the legacy CE router to attract less PIM state. PE router 20A and PE router 20B are connected to an Upgraded CE router. It may be the case that the upgraded CE router 22A can handle a higher volume of joins, while the legacy CE router 22C can only handle a lower amount of joins. PE router 20A and PE router 20B advertise UMH-Weight value of 4 to attract more PIM state. This UMH-Weight data is passed to the MVPN Join hash algorithm on egress PE router 20D. The egress PE router 20D determines the number of MVPN Joins to be sent to each Multi-Homed Upstream PE router 20 as per the formula set forth above, such that fewer join messages are sent to PE router 20C coupled to the legacy CE router, and ultimately a smaller amount of multicast traffic flows through the legacy CE router and PE router 20C. The result is flexible MVPN Join Load Balance.

Figure 4:
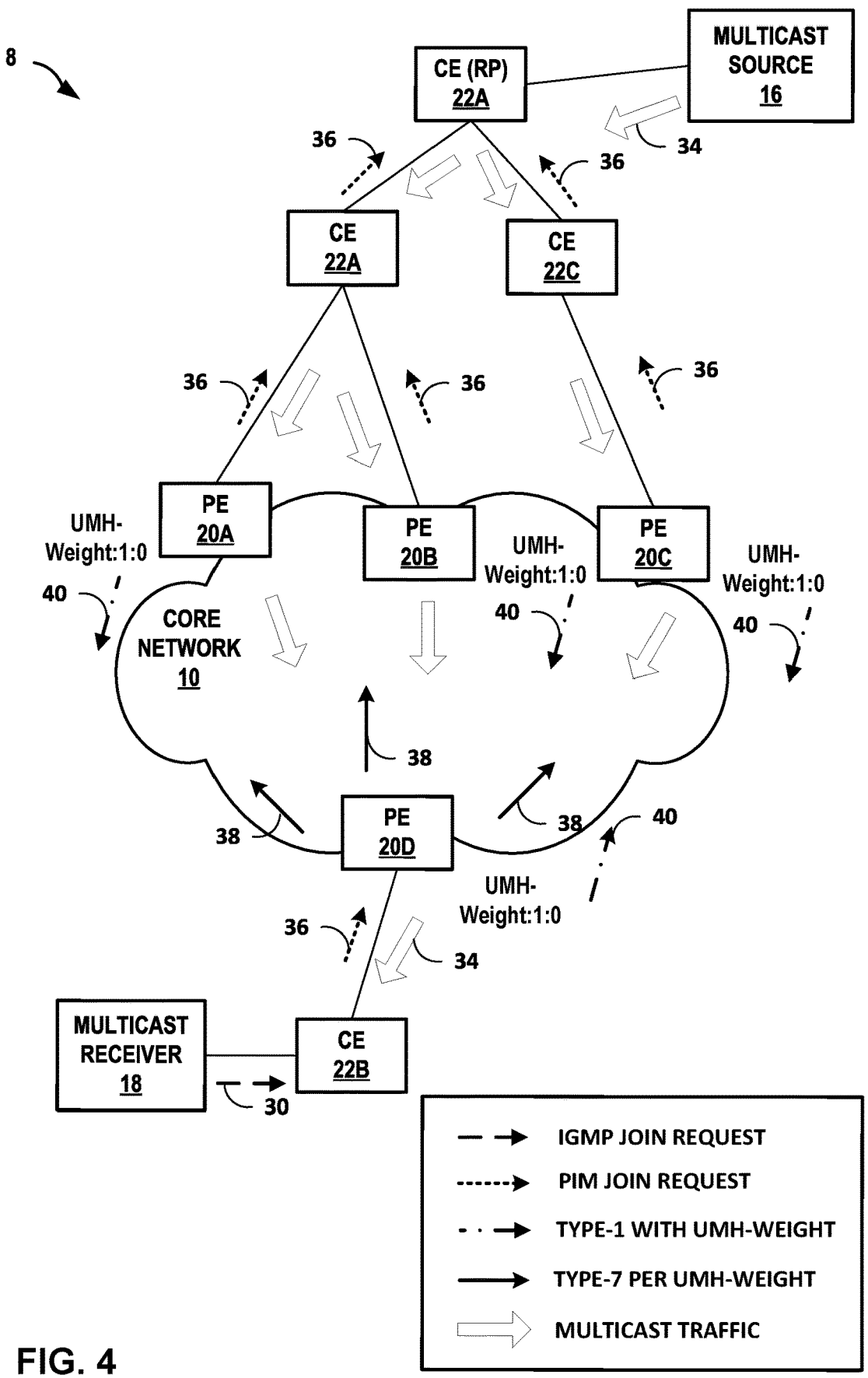

FIG. 4 is a block diagram illustrating an example computer network 8 including network devices configured to transmit multicast traffic between a multicast source 16 and a multicast receiver 18, in accordance with aspects of the techniques of this disclosure. As illustrated in FIG. 4, all BGP-MVPN PE routers exchange Type 1 MVPN Route with UMH-Weight Extended Community attribute. All Multi-Homed Upstream PEs with UMH-Weight as 1 form Candidate list. MVPN Joins are distributed across Multi-Homed Upstream PEs (Candidate list) using "least loaded" algorithm. Joins (Type-6s/7s) sent per Upstream PE router is maintained by the egress PE router 20D in the MVPN Route Table. MVPN Join is sent to the least loaded Upstream PE router, and eventually all MVPN Joins get distributed using least loaded approach across Multi-Homed Upstream PEs (Candidate list). The result is Flexible MVPN Join Load Balance.

Figure 5:
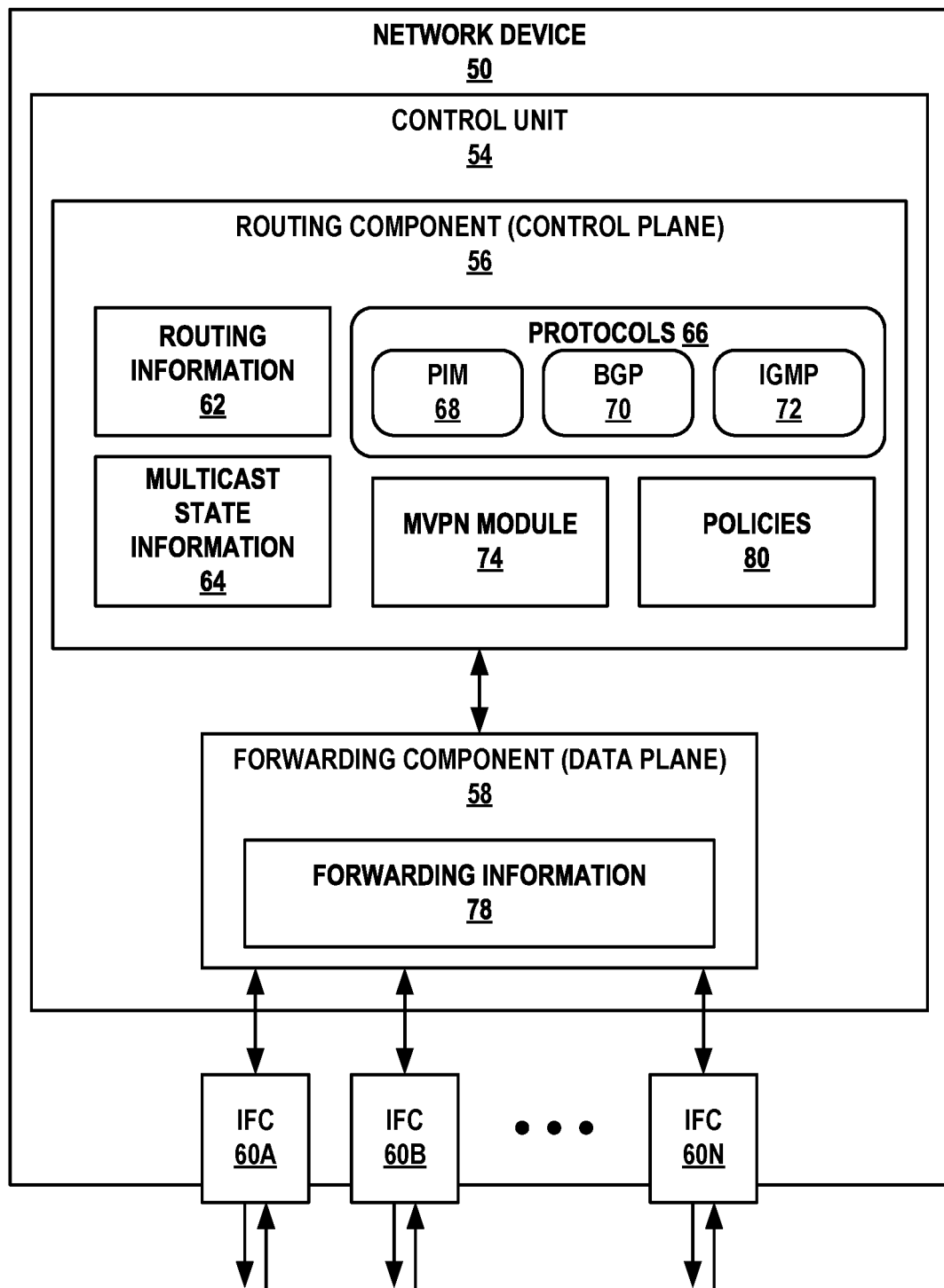
FIG. 5 is a block diagram illustrating an example network device configured to operate in accordance with techniques of this disclosure.

FIG. 5 is a block diagram illustrating an example network device 50 configured to operate in accordance with techniques of this disclosure. In one example, network device 50 may operate as an ingress network device to a core network, such as an MPLS core network. In another example, network device 50 may operate as an egress network device to the core network. When operating as an ingress network device for the core network, network device 50 is configured to calculate and advertise an upstream multicast hop weight. For example, network device 50 may operate substantially similar to ingress PE routers 20A-20C of FIG. 1. When operating as an egress network device for the core network, network device 50 is configured to selectively sending join messages based on received upstream multicast hop weight advertisements. For example, network device 50 may operate substantially similar to egress PE router 20D of FIG. 1. In some examples, network device 50 may be configured for both ingress and egress operation.

In the illustrated example of FIG. 5, network device 50 includes interface cards 60A-60N ("IFCs 60") that receive control and data packets via incoming links and send control and data packets via outbound links. IFCs 60 are typically coupled to the incoming links and the outbound links via a number of interface ports. Network device 50 also includes a control unit 54 that determines routes of received packets and forwards the packets accordingly via IFCs 60.

Control unit 54 includes a routing component 56 and a forwarding component 58. Routing component 56 operates as the control plane for network device 50 and includes an operating system (not shown) that may provide a multi-tasking operating environment for execution of a number of concurrent processes. For example, routing component 56 provides an operating environment for various protocols 66 that perform routing functions for network device 50. In the illustrated example of FIG. 5, routing component 56 includes a border gateway protocol (BGP) module 70 as a unicast routing protocol used to exchange routing information with other network devices in a network in order to discover the network topology and update routing information 62, and sending routes for MVPN auto-discovery, provider tunnel signaling, and customer multicast route signaling. In addition, routing component 56 includes PIM module 68 as a multicast routing protocol used to build multicast distribution trees with the other network devices in the network using routing information 62 and multicast state information 64.

Routing component 56 also includes IGMP 72 as a communications protocol used to establish multicast group memberships with IGMP hosts, e.g., receivers and sources, within customer sites external to the network. In some examples, routing component 56 may receive IGMP report messages identifying a multicast group and, in some cases, a source of the multicast group in which an IGMP host is interested. Routing component 56 may, in some examples, use PIM module 68 to generate the multicast control messages (e.g., PIM join messages and/or PIM prune messages) used to build the multicast distribution trees in the network.

Routing information 62 may describe the topology of the network in which network device 50 resides and may also describe various routes within the network and the appropriate next hops for each route, i.e., the neighboring network devices along each of the routes. Routing information 62 may include a list of incoming interfaces (IIFs) and a list of outgoing interfaces (OIFs) that indicate which of IFCs 60 are connected to the neighboring network devices in each route. For example, a given route may comprise a multicast route for multicast traffic of a given multicast group. In that example, the list of IIFs included in routing information 62 may include a list of upstream interfaces for all upstream neighbor network devices that have state for the given multicast group, and the list of OIFs included in routing information 62 may include a list of downstream interfaces for all downstream neighbor network devices that have state for the given multicast group.

Multicast state information 64 may describe a current status of interfaces for the neighboring network devices in the multicast distribution trees established using PIM module 68. For example, multicast state information 64 may include multicast state (e.g., PIM join state and PIM prune state) for each different multicast group within a range for a given multicast distribution tree. More specifically, for each multicast group, multicast state information 64 may include upstream and downstream interfaces toward neighboring network devices that belong to the respective multicast group.

MVPN module 74 may be configured to establish and maintain MVPN distribution trees or tunnels within the network using one or both of PIM module 68 and BGP module 70. In cooperation with MVPN module 74, BGP module 70 sends and receives MVPN-related route messages and may forward receive messages to MVPN module 74 for processing. In addition, MVPN module 74 may map MVPN membership information of other network devices within the network and generate multicast state for a given MVPN based on the MVPN membership information. In some examples, MVPN module 74 may store multicast state for one or more MVPNs in multicast state information 64. For example, MVPN module 74 may store to multicast state information 64 or routing information 62 information indicating when BGP type-5 routes have been received for particular multicast (S,G), and may subsequently update multicast state information 64 or routing information 62 to remove entries when the type-5 routes have been withdrawn.

Routing component 56 analyzes routing information 62 and multicast state information 64 to generate forwarding information 78 installed in forwarding component 58. Forwarding component 58 provides data plane functionality for network device 50. Although not shown in FIG. 5, forwarding component 58 may comprise a central processing unit (CPU), memory and one or more programmable packet-forwarding application-specific integrated circuits (ASICs). Forwarding information 78 associates network destinations with specific next hops and corresponding ports of IFCs 60.

According to the techniques of this disclosure, MPVN module 74 attaches the UMH-Weight Extended Community Attribute to an auto discovery route (e.g., a type 1 MVPN route) originated by network device 50. A new MVPN configuration option triggers the PE routers to attach the "UMH-Weight" Extended Community to the type 1 MVPN route. The type 1 MVPN route specifies a multicast source, a multicast group, and the UMH weight value for multicast traffic for the multicast source and the multicast group. Network device 50 may send the type 1 MVPN route to all peer network devices in the MVPN.

For example, network device 50 may determine, based on an amount of upstream access bandwidth between network device 50 and a customer edge device, an upstream multicast hop weight value for multicast traffic for a multicast source and a multicast group. The customer edge device is positioned between the ingress network device and the multicast source. In some examples, network device 50 is configured with an upstream multicast hop weight value to use in the UMH-weight field of the type 1 MVPN route.

When network device 50 operates as an egress network device in a network, network device 50 receives a type 1 MVPN routes from each of a plurality of ingress network devices. One or more of the type 1 MVPN routes includes a UMH-Weight value. The UMH-Weight data associated with each of the upstream PE routers from the received messages is passed to the MVPN Join hash algorithm portion of MPVN module 74 on network device 50. MVPN on egress PE router 20D thus has access to the additional data point(s) of the UMH-Weight values received from the ingress PE routers 20A-20C.

MPVN module 74 computes a number of MVPN Join messages (e.g., type-6 or type-7 join requests) to be sent to each Multi-Homed Upstream PE router 20. MPVN module 74 selects, based on the upstream multicast hop weight values specified by the received messages, one of the plurality of ingress network devices to which to send a multicast join message for the multicast source and multicast group.

For example, MVPN module 74 determines, based on the upstream multicast hop weight values specified by the received messages, a proportion of multicast join messages to send to each of a plurality of ingress network devices for the multicast source and multicast group. MVPN module 74 selects one of the plurality of ingress network devices to which to send the multicast join message based on the determined proportions, and network device 50 sends the plurality of multicast join messages for the multicast source and multicast group to one or more of the plurality of ingress network devices according to the determined proportions.

As part of determining the proportion of multicast join messages to send to each of the plurality of ingress network devices, MVPN module 74 assigns a different set of one or more index numbers to each of one or more of the ingress network devices, the one or more index numbers including one or more integers between 0 and 99, according to the corresponding upstream multicast hop weight value for the ingress network device divided by a sum of the upstream multicast hop weight values from each of the plurality of ingress network devices.

As one example, MVPN module 74 determines the number of MVPN join messages per upstream PE router based on determining the sum of UMH Weights of all Multi-Homed PEs, Y, and also determines a percentage P of MVPN Joins to be hashed to an upstream PE router according to the following equation:

$$P=(X*100)/Y,$$

where X is the UMH Weight of the Multi-Homed upstream PE router.

When network device 50 receives a multicast join message specifying the multicast source by a Customer-Root address and specifying the multicast group by a Customer-Group address, in some examples MVPN module 74 applies a hash function that includes a bytewise exclusive-or operation on bytes in the Customer-Root address and the Customer-Group address of the multicast join message to obtain a result of the hash function. MVPN module 74 takes the result of the hash function modulo 100 to determine an index number between 0 and 99, and selects one of the ingress network devices to which to send a multicast join message based on the index number.

In this way, MVPN module 74 assigns each upstream PE router to a list of numbers (index or positional numbers), such that fewer join messages are sent to an upstream PE that advertised a lower weight value. Network device 50 sends the multicast join message to the selected one of the plurality of ingress network devices. Subsequent to sending a plurality of multicast join messages, network device 50 receives multicast traffic for the multicast source and multicast group from the one or more ingress network devices in proportion to the plurality of multicast join messages sent to each and forwards the received multicast traffic.

In some examples, network device 50 sends the multicast join message to the selected one of the one or more of the plurality of ingress network devices, wherein assigning a different set of one or more index numbers to each of one or more of the plurality of ingress network devices includes assigning a different set to any of the plurality of ingress network devices that sent a non-zero upstream multicast hop weight value.

In some examples, at least one of the auto discovery (type 1) messages received by network device 50 specifies an upstream multicast hop weight value of zero for one of the plurality of ingress network devices, and MPVN module 74 determines the proportion of multicast join messages to send to the one of the plurality of ingress network devices at least by determining to send zero multicast join messages to the one of the plurality of ingress network devices.

In some examples, when network device 50 receives a further message from a further ingress network device for the network device, a message for the multicast source and multicast group, wherein the further message does not include a field specifying an upstream multicast hop weight value, MVPN module 74 assumes a default upstream multicast hop value for the further ingress network device. In this case, MVPN module 74 determines the proportion of multicast join messages to send the upstream ingress PE routers including this further ingress network device based on the default upstream multicast hop value and the upstream multicast weight values specified by the received messages. For example, if UMH-Weight Extended Community is not present in a Type 1 MVPN route received from an upstream PE router (e.g., a Legacy BGP-MVPN PE router), then MVPN module 74 provides a default UMH-Weight value of 1 to the hashing algorithm on network device 50. If UMH-Weight is Zero, then MVPN module 74 excludes the upstream PE router from hash computation. MVPN module 74 hashes the MVPN shared tree join routes and source tree join routes (Type 6/Type 7 routes) across the upstream ingress PE routers in accordance with the UMH Weights. In some examples, the MVPN Join Hashing Algorithm on MVPN module 74 can further be enhanced by feeding data on bandwidth of each multicast stream/flow to MVPN module 74 via policies 80 on network device 50.

In other examples, where the upstream multicast hop weight values have a value of either 0 or 1, MVPN module 74 keeps track of a number of multicast join messages sent to each of the plurality of ingress network devices, such as by storing the number in a database (e.g., multicast state information 64). MVPN module 74 selects one of the plurality of ingress network devices to which to send the multicast join message by selecting, based on the database, a least-loaded one of each of the plurality of ingress network devices from which a message is received specifying an upstream multicast hop weight value of 1. The least-loaded ingress network device is the one currently having a smallest number of join messages.

For example, network device 50 receives a Type 1 MVPN route from upstream PE routers that advertise a UMH-Weight Extended Community Attribute with a value of zero (0) or one (1). If UMH-Weight is Zero, then MPVN module 74 excludes the upstream PE router 20 advertising the weight of zero from a candidate list, i.e., the upstream PE router 20 is not considered for sending any Joins. All Multi-Homed Upstream PE routers 20 with UMH-Weight as 1 form a candidate list stored by MVPN module 74. MVPN Joins are distributed across Multi-Homed Upstream PEs (Candidate list) using a "least loaded" algorithm executed by MVPN module 74. Joins (Type 6/7 routes) sent per Upstream PE are maintained in an MVPN Route Table, such as multicast state information 64. MVPN Join is sent to the least loaded Upstream PE, and eventually all MVPN Joins get distributed using the least loaded approach across Multi-Homed Upstream PEs (Candidate list). A user/administrator of network device 50 could also be provided an option to 'rebalance' MVPN Joins at an appropriate time. For Draft-Morin/Hot-Root-Standby deployments, MVPN module 74 can use the "least loaded" algorithm to select a backup Upstream PE router, as well. In this example, MVPN module 74 excludes the Primary UMH and reruns the hash to select the Backup UMH.

The techniques of this disclosure are applicable for Intra-AS, Inter-AS Multi-Homed BGP-MVPN deployments, for example. The techniques of this disclosure can inter-operate with Legacy BGP-MVPN PEs. The techniques of this disclosure are applicable for Shared-Tree Joins (*,G)/Type-6 and Source-Tree Joins (S,G)/Type-7.

MVPN Joins are hashed across Multi-Homed Upstream PEs in accordance to Upstream Weights. The hash computation also considers bandwidth of each multicast group/channel if provisioned on network device 50. Network device 50 does not need any changes in forwarding constructs (in forwarding information 78) since the problem is addressed in the control plane of network device 50. The procedures are applicable for both IPV4 and IPV6 Multicast. The procedures can also be extended for Draft-Morin/Hot-Root-Standby Deployments. The solution ensures flexibility in distribution of MVPN Joins to cater to a wide variant of use cases.

Although the techniques of this disclosure are described for purposes of example in terms of BGP-MVPN deployment, the techniques of this disclosure are also applicable to a native PIM deployment. Thus, in some examples, PIM module 68 may be configured to operate in a manner similar to that described above with respect to MVPN module 74. In this case, rather than a type 1 MVPN auto discovery message including the UMH weight value, it may be a PIM message that is sent or received by network device 50 that advertises a UMH weight value. In some examples, network device 50 may not include an MVPN module 74, and PIM module 68 may operate in accordance with the techniques of this disclosure to select an upstream ingress router to which to forward join requests based on advertised UMH weight values.

The architecture of network device 50 illustrated in FIG. 5 is shown for example purposes only and should not be limited to this architecture. In other examples, network device 50 may be configured in a variety of ways. In one example, some of the functionally of control unit 54 may be distributed within IFCs 60. Control unit 54 may be implemented solely in software, or hardware, or may be implemented as a combination of software, hardware, or firmware. For example, control unit 54 may include one or more processors which execute software instructions. In that case, the various software modules of control unit 54 may comprise executable instructions stored on a computer-readable medium, such as computer memory or hard disk.

Figure 6:
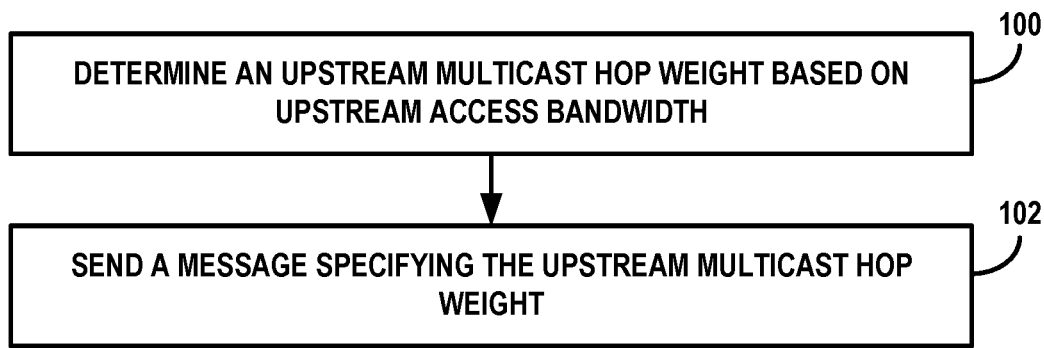
FIG. 6 is a flowchart illustrating an example operation of an ingress network device advertising an upstream multicast hop weight, in accordance with the techniques of this disclosure.

FIG. 6 is a flowchart illustrating an example operation of an ingress network device advertising an upstream multicast hop weight, in accordance with the techniques of this disclosure. FIG. 6 is described for purposes of example with respect to network device 50 of FIG. 5 but is also applicable to FIGS. 1-4 and may represent example operation of any of ingress PE routers 20A-20C.

An ingress network device determines, based on an amount of upstream access bandwidth between the ingress network device of a network and a customer edge device toward a multicast source, an upstream multicast hop weight value for multicast traffic for the multicast source and a multicast group (100). The ingress network device then sends, to one or more peer network devices for the network, a message specifying the upstream multicast hop weight value for the multicast traffic (102). For example, the ingress network device may be a provider edge router and may send the message to all other provider edge routers of the network. The message also specifies the multicast source and the multicast group. For example, the message may be a Border Gateway Protocol (BGP) Multicast Virtual Private Network (MVPN) auto discovery message having a transitive BGP Extended Community Attribute that specifies the upstream multicast hop weight value as an Upstream Multicast Hop Weight of the ingress network device.

In some examples, subsequent to the ingress network device determining the upstream multicast hop weight value, the ingress network device detects a change in upstream access bandwidth between the ingress network device and the customer edge device toward the multicast source. For example, links between the ingress network device and the customer edge device may have been added or deleted, causing the upstream access bandwidth to increase or decrease. In response to detecting the change in the upstream access bandwidth, the ingress network device determines an updated upstream multicast hop weight value, and sends, to the peer network devices for the network, a second message specifying the updated upstream multicast hop weight value for the multicast traffic. The second message also specifies the multicast source and the multicast group.

Figure 7:
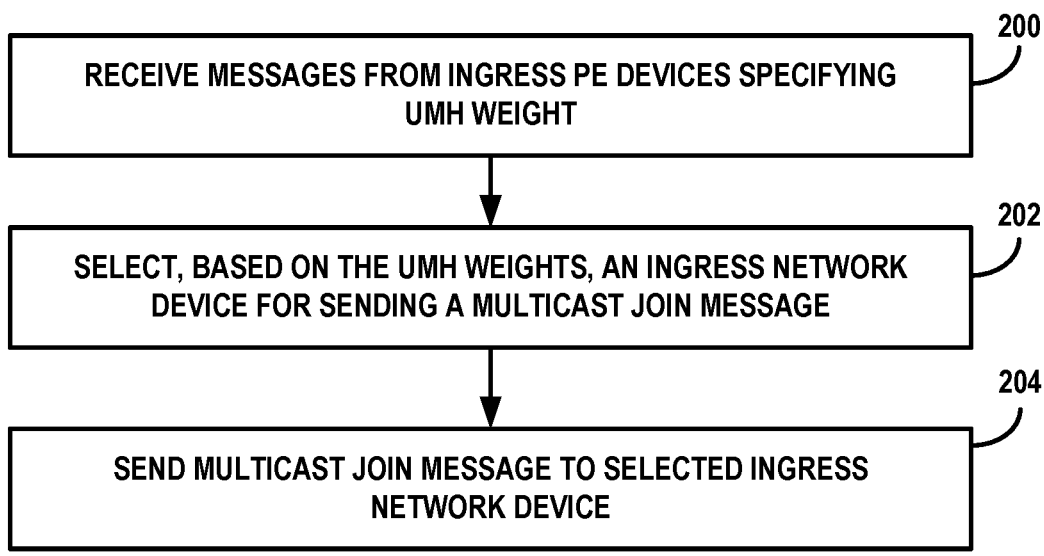
FIG. 7 is a flowchart illustrating an example operation of an egress network device in selectively sending join messages based on received upstream multicast hop weight advertisements, in accordance with the techniques of this disclosure.

FIG. 7 is a flowchart illustrating an example operation of an egress network device in selectively sending join messages based on received upstream multicast hop weight advertisements, in accordance with the techniques of this disclosure. FIG. 7 is described for purposes of example with respect to network device 50 of FIG. 5 but is also applicable to FIGS. 1-4 and may represent example operation of egress PE router 20D.

An egress network device, such as egress PE router 20D, receives messages from multiple ingress network devices for the network. The ingress network devices (e.g., ingress PE routers 20A-20C), are multihomed relative to a multicast source. Each of the messages specifies the multicast source, a multicast group, and an upstream multicast hop (UMH) weight value for multicast traffic for the multicast source and the multicast group (200). In response to receiving the messages, the egress network device selects, based on the upstream multicast hop weight values specified by the received messages, one of the ingress network devices to which to send a multicast join message of a plurality of multicast join messages for the multicast source and multicast group (202). The egress network device sends the multicast join message to the selected one of the plurality of ingress network devices (204).

For example, the egress network device may determine a proportion of join messages to send to each upstream ingress network device based on the upstream multicast hop weights, and may assign and send the join messages to a given one of the ingress network devices based on the determined proportions. The egress network device receives multicast traffic from the ingress PE devices in proportion to the joins and forwards the multicast traffic toward the interested receivers.

As another example, the upstream multicast hop weight values may have a value of either 0 or 1, depending on whether the upstream ingress network device intends to forward multicast traffic for the source. The egress network device stores, e.g., to a database, a number of multicast join messages sent to each of the plurality of ingress network devices. The egress network device may select the ingress network device to which to send the multicast join message by selecting, based on the database, a least-loaded one of the ingress network devices from which a message is received specifying an upstream multicast hop weight value of 1. The least-loaded one is the ingress network device currently having a smallest number of join messages assigned to it.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
   receiving, by an egress network device for a network, messages from each of a plurality of ingress network devices for the network, wherein each of the messages specifies a multicast source, a multicast group, and an upstream multicast hop weight value for multicast traffic for the multicast source and the multicast group;
   receiving, by the egress network device, a further message from a further ingress network device for the network, the message specifying the multicast source and multicast group, wherein the further message does not include a field specifying an upstream multicast hop weight value;
   in response to receiving the further message, assuming, by the egress network device, a default upstream multicast hop value for the further ingress network device;
   determining, by the egress network device and based on the default upstream multicast hop value and the upstream multicast hop weight values specified by the received messages, a proportion of multicast join messages to send to each of the plurality of ingress network devices and the further ingress network device for the multicast source and the multicast group;
   selecting, by the egress network device and based on the upstream multicast hop weight values specified by the messages and the default upstream multicast hop value, one of the plurality of ingress network devices to which to send a first multicast join message of a plurality of multicast join messages for the multicast source and the multicast group; and
   sending, by the egress network device and according to the determined proportions, the first multicast join message to the selected one of the plurality of ingress network devices.

2. The method of claim 1, further comprising:
   subsequent to sending the first multicast join message, receiving, by the egress network device, multicast traffic for the multicast source and the multicast group from one or more of the plurality of ingress network devices in proportion to a plurality of multicast join messages sent to each ingress network device; and
   forwarding, by the egress network device, the multicast traffic.

3. The method of claim 1, wherein the messages from each of the plurality of ingress network devices and the further message comprise auto discovery messages for the multicast source and the multicast group.

4. The method of claim 1, wherein the egress network device comprises an egress provider edge router of the network, wherein the plurality of ingress network devices comprise a plurality of ingress provider edge routers of the network, and wherein receiving the messages comprises receiving Border Gateway Protocol (BGP) Multicast Virtual Private Network (MVPN) auto discovery messages comprising a transitive BGP Extended Community Attribute that specifies the upstream multicast hop weight value as an Upstream Multicast Hop Weight of the ingress provider edge router from which the message is received.

5. The method of claim 1, wherein the upstream multicast hop weight values comprise a value of either 0 or 1, the method further comprising:
   storing, by the egress network device and to a database, a number of multicast join messages sent to each of the plurality of ingress network devices, and
   wherein selecting the one of the plurality of ingress network devices to which to send the first multicast join message comprises selecting, based on the database, a least-loaded one of each of the plurality of ingress network devices from which a message is received specifying an upstream multicast hop weight value of 1, the least-loaded one currently having a smallest number of join messages.

6. The method of claim 1, wherein determining the proportion of multicast join messages to send to each of the plurality of ingress network devices comprises assigning a different set of one or more index numbers to each of the one or more of the plurality of ingress network devices, the one or more index numbers comprising one or more integers between 0 and 99, according to the corresponding upstream multicast hop weight value for the ingress network device divided by a sum of the upstream multicast hop weight values from each of the plurality of ingress network devices, the method further comprising, by the egress network device:

receiving a second multicast join message specifying the multicast source by a Customer-Root address and specifying the multicast group by a Customer-Group address;

applying a hash function comprising a bytewise exclusive-or operation on bytes in the Customer-Root address and the Customer-Group address of the second multicast join message to obtain a result of the hash function;

taking the result of the hash function modulo 100 to determine an index number between 0 and 99;

selecting one of the one or more of the plurality of ingress network devices to which to send a third multicast join message based on the index number; and sending the third multicast join message to the selected one of the one or more of the plurality of ingress network devices.

7. The method of claim 6, wherein assigning the different set of one or more index numbers to each of one or more of the plurality of ingress network devices comprises assigning the different set to any of the plurality of ingress network devices that sent a non-zero upstream multicast hop weight value.

8. The method of claim 1, wherein at least one of the messages specifies an upstream multicast hop weight value of zero for one of the plurality of ingress network devices, and wherein determining the proportion of multicast join messages to send to the one of the plurality of ingress network devices comprises determining to send zero multicast join messages to the one of the plurality of ingress network devices.

9. The method of claim 1, wherein the default upstream multicast hop value comprises a value of one.

10. A network device comprising:

a memory; and one or more processors implemented in circuitry and configured to:

receive messages from each of a plurality of ingress network devices for a network, wherein each of the messages specifies a multicast source, a multicast group, and an upstream multicast hop weight value for multicast traffic for the multicast source and the multicast group, wherein at least one of the messages specifies an upstream multicast hop weight value of zero for one of the plurality of ingress network devices;

determine, based on the upstream multicast hop weight values specified by the received messages, a proportion of multicast join messages to send to each of the plurality of ingress network devices, including to determine to send zero multicast join messages to the one of the plurality of ingress network devices for which the upstream multicast hop weight value of zero was specified;

select, based on the determined proportions, one of the plurality of ingress network devices to which to send a first multicast join message of a plurality of multicast join messages for the multicast source and multicast group; and send the first multicast join message to the selected one of the plurality of ingress network devices.

11. The network device of claim 10, wherein the one or more processors are configured to:

subsequent to sending the plurality of multicast join messages, receive multicast traffic for the multicast source and multicast group from the one or more of the plurality of ingress network devices in proportion to a plurality of multicast join messages sent to each ingress network device; and forward the multicast traffic.

12. The network device of claim 10, wherein the network device comprises an egress provider edge router of the network, wherein the plurality of ingress network devices comprise a plurality of ingress provider edge routers of the network, and wherein the messages comprise Border Gateway Protocol (BGP) Multicast Virtual Private Network (MVPN) auto discovery messages comprising a transitive BGP Extended Community Attribute that specifies the upstream multicast hop weight value as an Upstream Multicast Hop Weight of the ingress provider edge router from which the message is received.

13. The network device of claim 10, wherein the one or more processors being configured to determine the proportion of multicast join messages to send to each of the plurality of ingress network devices comprises the one or more processors being configured to assign a different set of one or more index numbers to each of the one or more of the plurality of ingress network devices, the one or more index numbers comprising one or more integers between 0 and 99, according to the corresponding upstream multicast hop weight value for the ingress network device divided by a sum of the upstream multicast hop weight values from each of the plurality of ingress network devices;

wherein the one or more processors are further configured to:

receive a second multicast join message specifying the multicast source by a Customer-Root address and specifying the multicast group by a Customer-Group address;

apply a hash function comprising a bytewise exclusive-or operation on bytes in the Customer-Root address and the Customer-Group address of the second multicast join message to obtain a result of the hash function;

take the result of the hash function modulo 100 to determine an index number between 0 and 99;

select one of the one or more of the plurality of ingress network devices to which to send a third multicast join message based on the index number; and send the third multicast join message to the selected one of the one or more of the plurality of ingress network devices.

14. The network device of claim 10, wherein the upstream multicast hop weight values comprise a value of either zero or one, wherein the one or more processors are configured to store, to a database, a number of multicast join messages sent to each of the plurality of ingress network devices, and wherein the one or more processors being configured to select the one of the plurality of ingress network devices to which to send the first multicast join message comprises the one or more processors being configured to select, based on the database, a least-loaded one of each of the plurality of ingress network devices from which a message is received specifying an upstream multicast hop weight value of one.

15. A method comprising:

determining, by an ingress network device for a network and based on an amount of upstream access bandwidth between the ingress network device and a customer edge device, an upstream multicast hop weight value for multicast traffic for a multicast source and a multicast group, the customer edge device being positioned between the ingress network device and the multicast source;

sending, by the ingress network device and to one or more peer network devices for the network, a first message specifying the upstream multicast hop weight value for the multicast traffic, wherein the first message further specifies the multicast source and the multicast group;

subsequent to the determining, determining, by the ingress network device and in response to detecting a change in upstream access bandwidth between the ingress network device and the customer edge device, an updated upstream multicast hop weight value; and sending, by the ingress network device and to the peer network devices for the network, a second message specifying the updated upstream multicast hop weight value for the multicast traffic, wherein the second message further specifies the multicast source and the multicast group.

16. A method comprising:

receiving, by an egress network device for a network, messages from each of a plurality of ingress network devices for the network, wherein each of the messages specifies a multicast source, a multicast group, and an upstream multicast hop weight value for multicast traffic for the multicast source and the multicast group;

assigning a different set of one or more index numbers to each of the plurality of ingress network devices, the one or more index numbers comprising one or more integers between 0 and 99, according to the corresponding upstream multicast hop weight value for the ingress network device divided by a sum of the upstream multicast hop weight values from each of the plurality of ingress network devices;

receiving a multicast join message specifying the multicast source by a Customer-Root address and specifying the multicast group by a Customer-Group address;

applying a hash function comprising a bytewise exclusive-or operation on bytes in the Customer-Root address and the Customer-Group address of the multicast join message to obtain a result of the hash function;

taking the result of the hash function modulo 100 to determine an index number between 0 and 99;

identifying, by the egress network device and based on the index number, the one of the plurality of ingress network devices corresponding to the set of index numbers containing the determined index number; and sending, by the egress network device, the multicast join message to the identified one of the plurality of ingress network devices.

* * * * *